May 14, 1968 L. DIVEN 3,383,680

MULTI-PULSE MODULATOR FOR RADAR TRANSPONDER

Filed April 26, 1966 3 Sheets-Sheet 1

Inventor
LISCUM DIVEN
BY
Mueller, Aichele & Rauner
ATTYS.

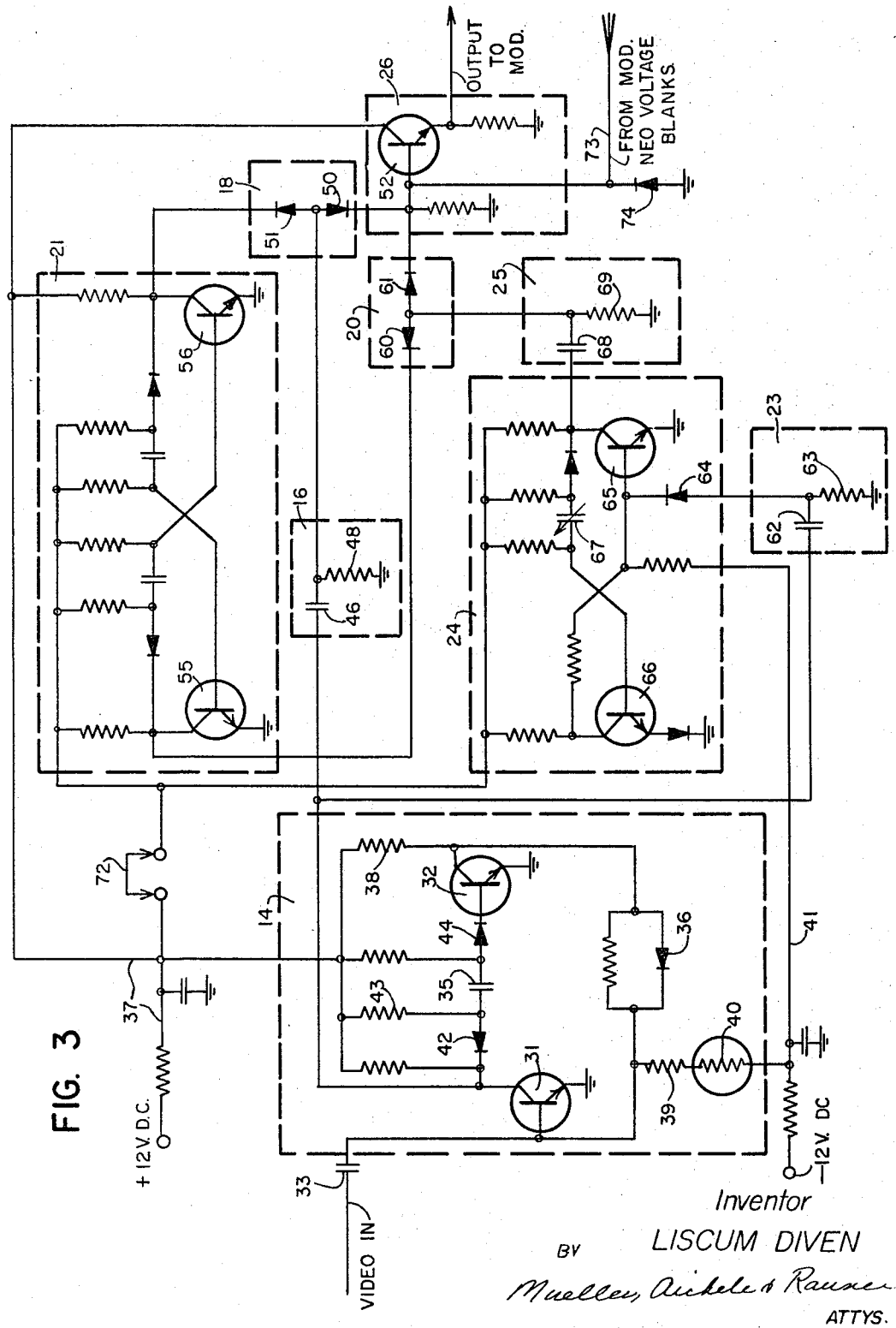

May 14, 1968 L. DIVEN 3,383,680
MULTI-PULSE MODULATOR FOR RADAR TRANSPONDER
Filed April 26, 1966 3 Sheets-Sheet 3
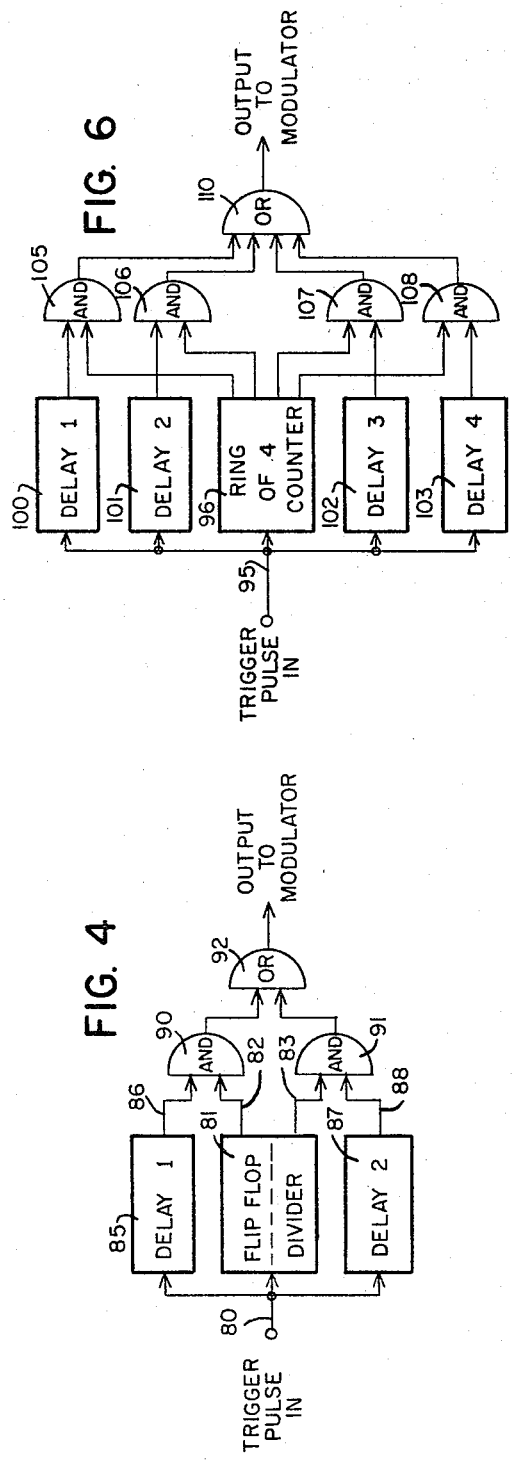
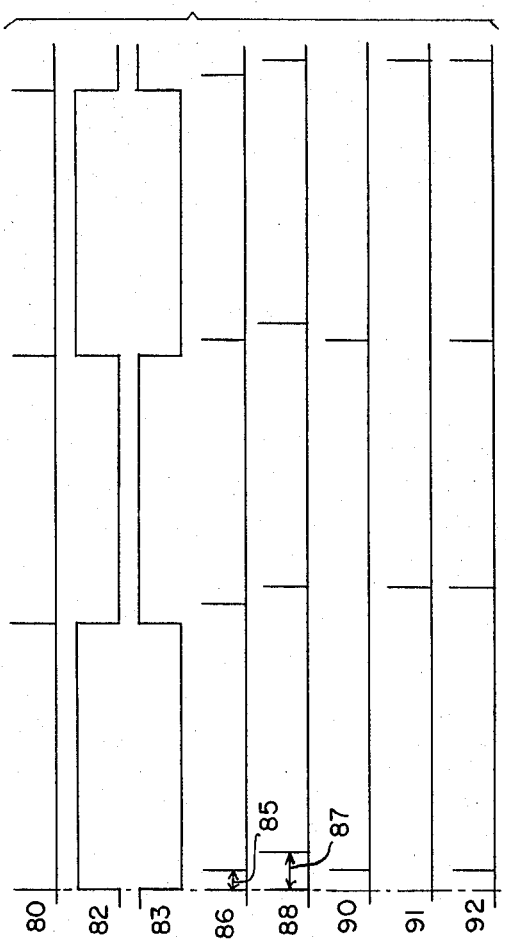
Inventor
LISCUM DIVEN
BY
Mueller, Aichele & Rauner
ATTYS.

United States Patent Office 3,383,680
Patented May 14, 1968

3,383,680
MULTI-PULSE MODULATOR FOR
RADAR TRANSPONDER
Liscum Diven, Scottsdale, Ariz., assignor to Motorola,
Inc., Franklin Park, Ill., a corporation of Illinois
Filed Apr. 26, 1966, Ser. No. 545,323
15 Claims. (Cl. 343—6.8)

ABSTRACT OF THE DISCLOSURE

A radar transponder receiving repetitive pulses and selectively providing different delays for such pulses. A plurality of paths each having a different delay period to successively pass different pulses. The outputs of the paths are joined such that the transponder emits a train of pulses respectively having selectively varied time positions within such train for identifying the transponder.

This invention relates generally to a pulse coding system, and more particularly to a multi-pulse commutator for a radar transponder.

Radar transponders adapted to be carried on aircraft or other vehicles respond to pulses received from radar transmitters and provide reply pulses which are received by the receiver at the radar station. It is desired to code the reply pulses so that the signal received at the radar station identifies the particular aircraft or vehicle from which the reply is received. In some applications a simple two pulse reply is provided, with the spacing between the two pulses identifying the different transponders. That is, the time interval between the pulses is different for each transponder.

It is desired that the transponder equipment be small so that it will require a minimum of space on the aircraft, and also that it consume as little power as possible. In order to meet the space and power requirements, equipment has been provided using semiconductors to the largest extent possible. To provide the radio frequency output power required, a magnetron may be used as the transmitter oscillator, and this may be effectively modulated by a line pulser type modulator that uses a silicon controlled rectifier as a switch. However, silicon controlled rectifiers require a finite time for recovery and it is, therefore, not possible to provide two closely spaced pulses from a single silicon controlled rectifier type modulator. Although it is possible to use a plurality of modulators, this increases the cost and size, as well as the power consumption.

It is, therefore, an object of the present invention to provide a pulse coding system providing repeating pulses at different times positions to form a code and wherein the pulses occur in different frames to provide adequate pulse spacing.

Another object of the invention is to provide a pulse coding system which responds to regularly recurring pulses and provides one output pulse for each applied pulse, and wherein the output pulses are delayed with respect to the applied pulses by different amounts to provide an identifying code.

A further object of the invention is to provide a radar transponder which responds to interrogation pulses and provides reply pulses, wherein the reply pulses of certain frames are delayed with respect to the received pulses so that the transmitted pulses are in different time positions to form an identifying code.

A feature of the invention is the provision of a pulse coding system for a radar transponder which responds to regularly recurring pulses and applies a pulse for each receiving pulse to one of a plurality of gating means, with pulses being applied to each gating means with a different time delay, and including switching means for actuating the gating means in turn so that the pulses in the successive frames are in different time positions. The pulses from the transponder, when viewed with a plurality of frames superimposed, will appear as spaced pulses forming a code.

Another feature of the invention is the provision of a commutator for a radar transponder including a monostable multivibrator which responds to pulses of a predetermined amplitude, with the output being differentiated and applied to a first gate and delayed pulses being differentiated and applied to a second gate, and including an astable multivibrator which provides a second input to the two gates so that the gates are rendered operative in turn to pass direct pulses and delayed pulses to an isolation amplifier which feeds the transponder modulator. The astable multivibrator may have a period several times greater than the period of the received pulses so that a plurality of direct pulses will be applied and then a plurality of delayed pulses.

A further feature of the invention is the provision of a commutator for a radar transponder including means providing trigger pulses which operate a flip-flop divider or ring counter to render a plurality of gates operative in turn, and delay devices for applying the pulses to the gates so that the pulses applied to the different gates are delayed different amounts with respect to the trigger pulse. The pulses in different frames which are delayed different amounts simulate closely spaced pulses to identify the particular transponder.

The invention is illustrated in the drawing wherein:

FIG. 3 is a circuit diagram of the commutator circuit of the system of FIG. 1;

FIG. 4 is a block diagram of a modification of the commutator circuit;

FIG. 5 is a timing diagram of the embodiment of FIG. 4; and

FIG. 6 is a block diagram of a further embodiment of the invention.

The invention provides a system for commutating a repeating series of trigger pulses to simulate closely spaced pulses to form a code. The pulses are applied to a plurality of gates with the pulses applied to the different gates being delayed by different amounts. The gates are actuated in sequence to pass the pulses so that the pulses in the different frames will appear in different time positions. When these pulses are reproduced by a device having a memory, such as by a radar scope, the persistence of the screen will provide a display of closely spaced pulses, and the spacing forms a code to identify the particular transponder. The commutation of the pulses can be provided by applying the trigger pulses derived from the received interrogation pulses through separate paths, which may include differentiators and delay generators, to two or more gates. A second enabling input is applied in each gate from a switching device so that the gates will open in turn to apply the pulses to an output device such as an isolation amplifier. When a two pulse code is provided, the switching means may be an astable multivibrator or a flip-flop divider actuated by the trigger pulses, and half of the pulses may be applied directly, and the other half delayed. To provide a more complex code, more gates might be provided and selectively rendered operative by a ring counter having the same number of stages as there are gates. The pulses are applied to the gates with different delays so that a multi-pulse code will be produced to identify the transponder. It is essential that the reproducing device have some kind of memory, such as the persistence of a cathode ray tube screen, which provides simultaneous reproduction of the pulses in successive fields, so that their position with respect to each other is indicated.

Figure 1:
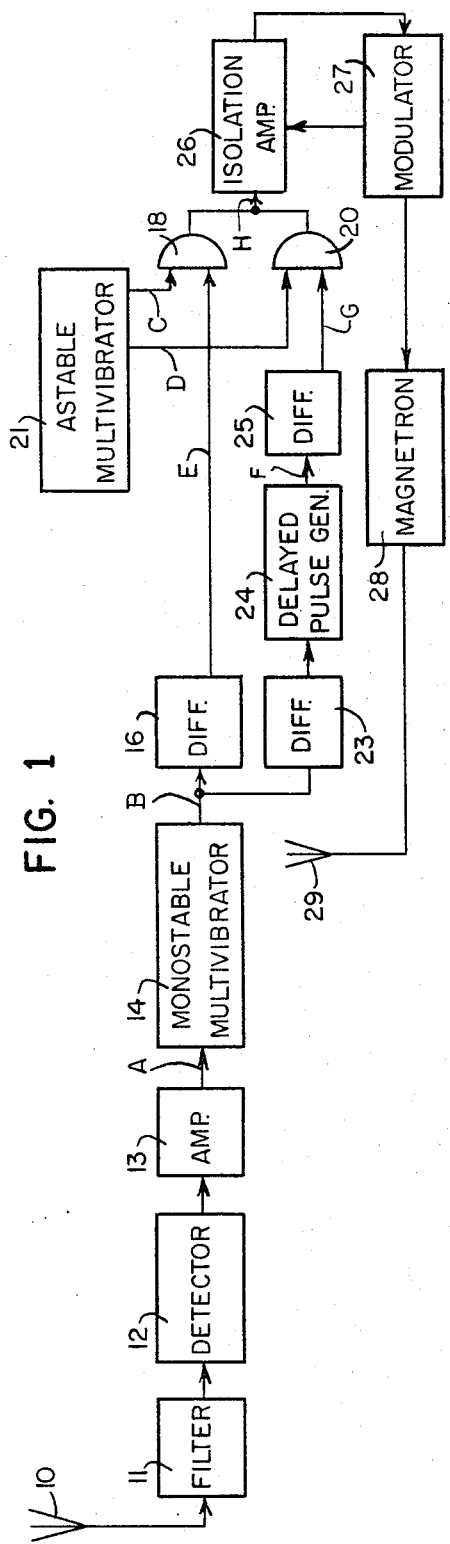
FIG. 1 is a block diagram of one embodiment of the transponder in accordance with the invention.

Referring now to the drawings, in FIG. 1 there is illustrated in block diagram form the transponder of the invention which includes a receiving antenna 10. Received signals are applied to an input filter 11, which can be of the high pass type and rejects signals of lower frequencies. For example, if the transponder is for the X band, the filter 11 will reject signals in the C band. A crystal detector 12 detects the signals applied thereto by the filter 11, and this may have a response which falls off above the band of interest. Therefore, the filter 11 and detector 12 have an overall bandpass effect to select the band of interest. The detected signals are applied to video amplifier 13 which provides pulses to the monostable multivibrator 14.

Figure 2:
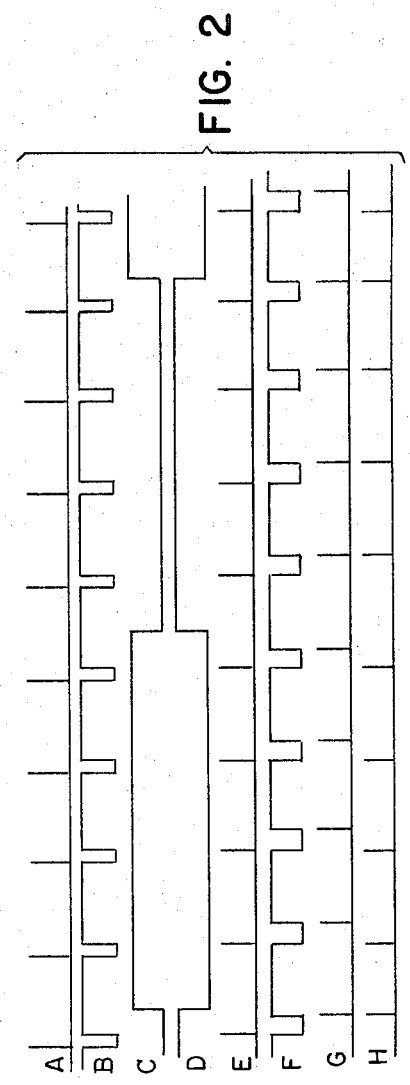
FIG. 2 is a timing diagram illustrating the operation of the system of FIG. 1.

The multivibrator 14 is triggered by pulses which reach a predetermined amplitude and provide output pulses of a given shape or configuration. Reference is made to FIG. 2 wherein the input pulses are shown by line A and the output pulses of the multivibrator 14 are shown by line B. The diagram of FIG. 1 is marked to correspond to the lines of FIG. 2 to indicate the points at which the pulses appear. The pulses from monostable multivibrator 14 are applied to differentiator 16 which provides a pulse at the lagging edge of the pulses from the multivibrator 14. These pulses, which are shown by the line E in FIG. 2, are applied to the AND gate 18. The AND gate 18 and similar AND gate 20 are selectively rendered operative by astable multivibrator 21. The multivibrator may have a period several times greater than the repetition rate of the trigger pulses. The output from the multivibrator 21 to the AND gates 18 and 20 renders the AND gates alternately operative to pulses applied thereto, with each being operative for a corresponding period of time. These outputs are shown by lines C and D of FIG. 2.

The output pulses from the monostable multivibrator 14 are also applied to differentiator 23 which provides pulses which trigger the monostable multivibrator 24. The pulses from the monostable multivibrator 24 are represented by line F in FIG. 2. The lagging edges of these pulses are differentiated by differentiator 25 and the resulting pulses are applied to the AND gate 20. These pulses are shown by line G in FIG. 2. The pulses applied to AND gate 20 are delayed with respect to the pulses applied to the AND gate 18 and this delay can be controlled to provide a code as will be further explained. The pulses from the gates 18 and 20 are applied in turn to the isolation amplifier 26, as the gates are alternately rendered operative by the astable multivibrator 21. As shown in line H of FIG. 2, there will be a group of pulses from each of the AND gates followed by a group from the other to provide pulses in two different time positions.

The pulses from the isolation amplifier are applied to the modulator 27 which may include a silicon controlled rectifier, and the modulating pulses are applied to magnetron 28. The output radio frequency pulses of the magnetron are radiated by an antenna 29. Alternatively, the pulses from the magnetron may be coupled to the receiving antenna 10 through a diplexing arrangement or circulator so that a single antenna is used for both transmitting and receiving, as is well known. Pulses from the modulator may be fed back to the isolation amplifier to blank the same to prevent response of the system to transmitted pulses. When the signal is received and reproduced, the pulses from successive fields will be superimposed so that the code formed by the spacing of the pulses is indicated.

Referring now to FIG. 3, there is shown a detailed circuit diagram of the commutator which includes the items 14 through 26 of FIG. 1. The monostable multivibrator 14 includes transistors 31 and 32, with transistor 32 being normally conducting. The trigger pulses are applied to the base of transistor 31 through capacitor 33 which provides DC isolation and also provides some differentiation of the incoming pulses so that a long trigger pulse will not hold the multivibrator 14 on for longer than its normal period. The period of conduction of the multivibrator is controlled by capacitor 35. This period controls the fixed delay of the transponder. The diode 36 provides a direct current path from the positive voltage line 37 through resistor 38 to hold transistor 31 on when transistor 32 is off. This prevents the negative voltage portion of the differentiated input pulse from turning off transistor 31. Resistor 38 has the dual function of being the load for transistor 32, and its value determines the amount of current supplied through diode 36 to hold transistor 31 on. Resistor 39 and thermistor 40 complete the circuit from diode 36 to the negative potential line 41 to provide a constant threshold voltage at the input of the multivibrator. Diode 42 cooperates with resistor 43 to allow a faster recovery of the collector of transistor 31, as necessary to have good trailing edge differentiation. The diode 44 prevents reverse base to emitter breakdown of the transistor 32. This diode is placed in the base circuit rather than in the emitter circuit so that it does not increase the emitter voltage in the on condition, which would reduce the hold off bias applied through diode 36 to the base of transistor 31.

The differentiator 16 includes capacitor 46 and resistor 48, which provide a sharp pulse at the trailing edge of each pulse from multivibrator 14. This is applied to the steering diode 50 of the gate 18, and is conducted therethrough when the diode 51 of the gate is reversed biased. The diode 50 applies the pulse to the base of transistor 52, which is an emitter follower and forms the isolation amplifier 26 of FIG. 1.

The astable multivibrator 21 includes transistors 55 and 56. This is a free running multivibrator having a period equal to several times the repetition frequency of the trigger pulses. The multivibrator 21 is symmetrical with transistors 55 and 56 conducting alternately for the same time durations. When the transistor 56 is off, the collector thereof is at the positive potential on conductor 37. This voltage reverse biases the diode 50 of gate 18 so the gate passes the pulse applied thereto. Alternately, when transistor 55 is off, its collector is at the positive potential on line 37 to reverse bias diode 60 of gate 20.

The pulses at the output of multivibrator 14 are also applied to the differentiator 23 which includes capacitor 62 and resistor 63. The differentiated pulses are applied through diode 64 to the monostable multivibrator 24 which includes transistors 65 and 66. Capacitor 67 controls the period of the monostable multivibrator 24 and this controls the delay of the pulses to thereby determine the code of the reply pulses. This capacitor can, therefore, be adjusted to change the code.

The pulse from the collector of transistor 65 of the multivibrator 24 is applied to the differentiator 25 which includes capacitor 68 and resistor 69. The differentiated pulse at the trailing edge of the pulse from multivibrator 24 is applied to diode 61 of gate 20. This is applied through diode 61 to the base of transistor 52 when the diode 60 is reversed biased, as previously described.

The system of FIG. 3 can be placed in a condition to provide a single pulse reply by removing the jumper 72 which energizes the astable multivibrator 21 and the monostable multivibrator 24. Transistor 56 of the multivibrator 21 will remain off so that diode 51 of gate 18 is reversed biased, and pulses from the multivibrator 14 pass through diode 50 to the isolation amplifier 26. However, the monostable multivibrator 24 will be off and there will be no pulses applied to the gate 20. Further the gate will attenuate any pulses applied as the diode 60 of the gate will not be reversed biased.

As previously stated, a blanking voltage is fed from the modulator to the isolation amplifier after each transmitted pulse. This is provided by a negative voltage applied on conductor 73 which clamps the base of transistor 52 to a negative voltage set by the forward voltage drop of diode 74. This holds transistor 52 cut off and prevents any pulses from triggering the modulator during the blanking period. This limits the number of pulses transmitted to provide protection of the magnetron against over-interrogation. During over-interrogation the transponder still replies, but at a lower rate than the interrogation rate, as controlled by the blanking of the amplifier 26.

FIG. 4 is a block diagram showing a second embodiment of the commutator of the invention. In this system the trigger pulses, such as provided by multivibrator 14 of FIG. 1, are applied at input 80. These pulses are applied to a bistable multivibrator or flip-flop 81 which functions as a divider. The divider has outputs 82 and 83 which are alternately conducting. FIG. 5 is a timing diagram of the system of FIG. 4 and line 80 thereof shows the input pulses and lines 82 and 83 the pulses at outputs 82 and 83. It will be seen that the first trigger pulse causes the flip-flop 81 to provide an output at 82 and the next pulse causes it to provide an output at 83, with the outputs continuing in an alternate manner.

The trigger pulses are also applied to the delay unit 85 which may be similar to the monostable multivibrator 24 and integrator 25 of FIG. 1. This provides output pulses on conductor 86 which are delayed with respect to the trigger pulses, as shown on line 86 in FIG. 5. Input pulses are also applied to delay unit 87 which provides delayed output pulses on conductor 88, with the delay of unit 87 being somewhat greater than the delay of unit 85. This is illustrated in line 88 of FIG. 5. The pulses on lines 82 and 86 are applied to AND gate 90, and when both pulses are present a pulse is applied to the OR gate 92. Accordingly, when the flip-flop 81 provides a gating signal on conductor 82, the output from delay unit 85 is applied to the OR gate 92. Similarly, the pulses on lines 83 and 88 are applied to AND gate 91, and the output of this AND gate is also applied to the OR gate 92. Therefore, when the flip-flop 81 energizes line 83, the pulses with the delay provided by unit 87 are applied to the OR gate 92. The output of the OR gate 92, which includes pulses from both AND gates 90 and 91, is applied to the modulator as shown in FIG. 1. FIG. 5 shows the pulses provided by the AND gates 90 and 91 and the OR gate 92.

The system of FIG. 4, therefore, applies pulses in successive frames which are in different time positions, so that when viewed on a cathode ray tube screen, or reproduced on some other device having memory action, the effect of two closely spaced pulses is simulated. This is accomplished, however, without actually transmitting pulses at close time spacing. In the system of FIG. 4, the switching between the pulses in the two positions is accomplished by the trigger pulse, and pulses in the two different positions are applied one after the other. This is to be contrasted with the system of FIG. 1 wherein a plurality of pulses in one position are transmitted and then a plurality of pulses in the other position. It is to be pointed out, however, that in the system of FIG. 1 the period of the astable multivibrator 21 can be made such that only one pulse in each position is transmitted at a time. This presents the problem, however, that the free running multivibrator might be switching at the time a pulse is applied. In the system of FIG. 4 the divider is triggered, and since the pulses applied by the delay units 85 and 87 are delayed with respect to the triggering time, there is no problem that the divider might be switching at the time pulses are applied to the AND gates by the delay units.

A further system in accordance with the invention is shown in FIG. 6. This system is generally similar to the system of FIG. 4 except that a four pulse code is provided rather than a two pulse code. The input trigger pulse is applied from conductor 95 to the ring counter 96 and to the delay units 100, 101, 102 and 103. The ring counter has four outputs actuated in turn by the trigger pulses to energize AND gates 105, 106, 107 and 108. The delay units 100 to 103 may provide successively larger delays so that the pulses are applied in turn therefrom to the AND gates 105 to 108. These pulses are applied to the OR gate 110 which may be coupled to the modulator of the transponder. The four pulses applied in four successive frames can, therefore, be spaced in various different ways to provide a larger number of identification codes. This requires that the reproducing device have a memory so that the four outputs can be simultaneously considered in determining the code which identifies the transponder.

It will be apparent that the system shown in FIG. 6 can be provided with any number of gates, such as 3 or 5 to provide a code having a corresponding number of pulses.

It may be desired to use the transponder in an application where a single transponder responds to interrogation pulses from a number of different radar systems. Usually these radar systems are not in synchronism. In the transponders illustrated in FIGS. 4 and 6 wherein the flip-flop which controls the gates is triggered by the interrogation pulses, a condition can arise that one radar trips the flip-flop and the next radar triggers it back so that the desired operation will not take place. Although this situation cannot continue because of lack of synchronism, it would upset the balanced relationship of time sharing between the reply pulses of the transponder. Under such conditions, the use of a free running multivibrator to control the gates, as illustrated in FIG. 1, is preferable. Although this can produce an occasional error when a pulse is received during the time that the multivibrator is switching between states, this will happen only infrequently. A free running multivibrator should have an interval longer than the interval between interrogation pulses of the radar having the lowest pulse repetition rate.

The system of the invention, therefore, makes it possible to simulate close spaced pulses while the actual pulses are spaced sufficiently to be produced by a modulator using a silicon controlled rectifier. For example, the apparent spacing may be from one to 50 microseconds to provide various different codes. As previously stated, in the system of FIG. 3 this interval is controlled by capacitor 67. Since the recovery time of a modulator using a silicon controlled rectifier may be of the order of 50 microseconds, if the pulses were provided in the same frame the minimum spacing would have to be 50 microseconds, and to provide a plurality of codes it would be necessary to move to larger spacings. Pulses so spaced would be difficult to reproduce in a manner easily indicating the code. For example, when shown on a radar scope the second pulse would be off the screen unless a very small range scan is used. By providing the delayed pulse in a different frame, the required pulse spacing is obtained while the pulses as reproduced would appear as close spaced pulses.

I claim:

1. A pulse coding system adapted to respond to regularly recurring pulses and to provide output pulses which simulate closely spaced pulses to provide an identifying code, said coding system including in combination, first means responsive to received pulses of a predetermined amplitude and providing trigger pulses therefrom, switching means having a plurality of outputs which are energized in turn for corresponding periods, with each period being at least as long as the interval between received pulses, a plurality of gate means respectively individually coupled to said outputs of said switching means and selectively rendered operative thereby, output means connected in common to said gate means, and second means coupled to said first means and having pulse delay means with portions respectively individually coupled to said gate means for delaying the received pulses by differing amounts through the respective portions for applying pulses derived from said trigger pulses to each gate means having a different time delay with respect to the received pulses, each of said gate means passing to said output means the pulses applied thereto when such gate means is rendered operative by said switching means.

2. A pulse coding system in accordance with claim 1 wherein, said switching means is an astable multivibrator having first and second outputs, said plurality of gate means includes first and second gate means, and said second means includes a portion responding to said trigger pulses for applying delayed pulses to said second gate means.

3. A pulse coding system in accordance with claim 1 wherein, said switching means is a bistable multivibrator actuated by said trigger pulses and has first and second outputs, said plurality of gate means includes first and second gate means respectively connected to said first and second outputs, and said second means includes first and second delay means actuated by said trigger pulses and applying pulses to said first and second gate means which are delayed by different amounts with respect to said trigger pulses.

4. A pulse coding system in accordance with claim 1 wherein, said switching means is a ring counter having at least three outputs, said plurality of gate means includes at least first, second and third gate means, and said second means includes a plurality of delay means each actuated by said trigger pulses and providing pulses with different delays respectively to said first, second and third gate means.

5. In a radar transponder adapted to respond to regularly recurring radar interrogation pulses and to provide reply pulses to identify the particular radar transponder, and wherein the transponder includes a receiver and a modulator, the coding system including in combination, first means responsive to pulses derived by the receiver and providing trigger pulses from received pulses which are of a predetermined amplitude, switching means having a plurality of outputs which are energized in turn for corresponding periods with each period being at least as long as the interval between received pulses, a plurality of gate means respectively individually coupled to said outputs of said switching means and selectively rendered operative thereby, output means connected in common to said gate means, and second means coupled to said first means and having pulse delay means with portions respectively individually coupled to said gate means for delaying the received pulses by differing amounts through the respective portions for applying pulses derived from said trigger pulses to each gate means having a different time delay with respect to the received pulses, each of said gate means passing to said output means the pulses applied thereto when such gate means is rendered operative by said switching means, said output means applying the pulses applied through said gate means to the modulator of the transponder.

6. The structure in accordance with claim 5 wherein, one of said portions of said second means includes a monostable multivibrator responsive to said trigger pulses and a differentiating circuit providing pulses at the trailing edge of the pulses from said multivibrator and applying such pulses to one of said gate means.

7. The structure in accordance with claim 5 wherein, said output means is an amplifier including a transistor connected in an emitter follower circuit, with said pulses from said gate means being applied to the base electrode of said transistor.

8. The structure in accordance with claim 5 wherein, said switching means is an astable multivibrator having first and second outputs, said plurality of gate means includes first and second gates and said second means includes a portion responding to pulses from said first means to apply delayed pulses to said second gate means.

9. The structure in accordance with claim 8 wherein, each of said gate means includes a steering diode and an attenuating diode connected to each other and poled to conduct current in opposite directions, and said astable multivibrator includes first and second transistors connected to said attenuating diodes of said first and second gates respectively, with said transistor when conducting providing a current path through the associated attenuating diode to attenuate the signal applied to the associated steering diode and said steering diodes connected to said output means.

10. The structure in accordance with claim 5 wherein, said switching means is a bistable multivibrator actuated by said trigger pulses having first and second outputs, said plurality of gate means include first and second gates, and said second means includes first and second delay means actuated by said trigger pulses and applying pulses to said first and second gates which are delayed by different amounts with respect to said trigger pulses.

11. The structure in accordance with claim 10 wherein, said first and second gates are AND gates, and said output means is an OR gate.

12. The structure in accordance with claim 5 wherein, said switching means is a ring counter having at least three outputs, said plurality of gate means includes at least first, second and third gates, and said second means includes a plurality of delay means each actuated by said trigger pulses and providing pulses with different delays to said first, second and third gate means.

13. The structure in accordance with claim 12 wherein, said first, second and third gates are AND gates, and said output means is an OR gate.

14. In a radar transponder adapted to respond to regularly recurring radar interrogation pulses and to provide reply pulses to identify the particular radar transponder, and wherein said transponder includes a receiver and a modulator, the coding system including in combination, first monostable multivibrator means responsive to pulses derived by the receiver and providing trigger pulses in response to pulses which are of a predetermined amplitude, an astable multivibrator having first and second outputs which are alternately energized for corresponding periods, with each period being at least as long as the interval between received pulses, first and second gate means coupled to said first and second outputs of said astable multivibrator respectively and selectively rendered operative thereby, output means connected in common to said first and second gate means, first differentiator means responsive to said trigger pulses for applying pulses to said first gate means with such pulses being applied to said output means when said first gate means is operative, a second monostable multivibrator providing pulses of a given width, second differentiator means responsive to said trigger pulses for applying pulses to said second monostable multivibrator for actuating the same, and third differentiator means for developing pulses at the trailing edge of the pulses from said second monostable multivibrator and applying the same to said second gate means, with such pulses being applied to said output means when said second gate means is operative, said output means applying the pulses applied through said gate means to the modulator of the transponder.

15. A radar transponder having receiving means for receiving a train of repetitive pulses and responsive to the repetitive pulses to generate a train of received pulses having a like repetition rate with each pulse occurring in a predetermined time position with respect to other pulses in the train, and transmitting means for transmitting pulses, the improvement including in combination,
switching means having a plurality of output lines and operative to supply repetitive pulse signals on each of said lines with the duration of each pulse signal being greater than an elapsed time required for two successively occurring ones of said received pulses to be received and the pulse signals on the different lines successively occurring at different times with respect one to another, pulse means having a given plurality of pulse delay portions each for delaying a pulse a different period of time, another pulse means having the given plurality of pulse gating portions respectively electrically connected to said pulse delay portions and each pulse gating portion being connected to a different one of said lines and responsive to a pulse signal on the respective lines for selectively passing pulses, one of said pulse means receiving said train of received pulses and supplying each received pulse to all portions within the one pulse means, each portion in a second one of said pulse means receiving pulses from the respective connected portions of said one pulse means, all portions in said second one of said pulse means having a common output means for re-establishing said received pulses into a train of supplied pulses having pulses of adjusted time positions with respect to other pulses in the train of supplied pulses when compared with corresponding pulses in the train of received pulses, and means coupling said common output means to the transmitting means for supplying said supplied pulses thereto.

References Cited

UNITED STATES PATENTS

| | | | |
|---|---|---|---|
| 3,054,100 | 9/1962 | Jones | 343—6.8 X |
| 3,092,830 | 6/1963 | Clock et al. | 343—6.8 |
| 3,125,753 | 3/1964 | Jones | 343—6.8 X |
| 3,145,380 | 8/1964 | Currie | 343—6.8 X |

RODNEY D. BENNETT, *Primary Examiner.*

RICHARD A. FARLEY, *Examiner.*

M. F. HUBLER, *Assistant Examiner.*